(12) United States Patent
Kondo

(10) Patent No.: US 8,601,559 B2
(45) Date of Patent: Dec. 3, 2013

(54) IMAGE OUTPUT AUTHENTICATION SYSTEM, IMAGE OUTPUT AUTHENTICATION SERVER, AND IMAGE OUTPUT AUTHENTICATION METHOD

(75) Inventor: Atsushi Kondo, Itami (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 1588 days.

(21) Appl. No.: 12/149,249

(22) Filed: Apr. 29, 2008

(65) Prior Publication Data

US 2009/0025072 A1 Jan. 22, 2009

(30) Foreign Application Priority Data

Jul. 18, 2007 (JP) ................................. 2007-187307

(51) Int. Cl.
*G06F 7/04* (2006.01)

(52) U.S. Cl.
USPC ........................................ 726/7; 726/4; 726/5

(58) Field of Classification Search
USPC ................................. 726/2–7; 358/1.14, 1.15
See application file for complete search history.

(56) References Cited

U.S. PATENT DOCUMENTS

| | | | |
|---|---|---|---|
| 2002/0041394 A1* | 4/2002 | Aoki | 358/1.15 |
| 2005/0002057 A1* | 1/2005 | Oe | 358/1.15 |
| 2005/0044248 A1 | 2/2005 | Mihira et al. | |
| 2006/0107039 A1 | 5/2006 | Sugiura et al. | |
| 2006/0229998 A1* | 10/2006 | Harrison et al. | 705/78 |
| 2006/0256370 A1 | 11/2006 | Murakawa | |
| 2006/0279768 A1* | 12/2006 | Wang et al. | 358/1.15 |
| 2007/0050050 A1 | 3/2007 | Tanida | |
| 2007/0081186 A1* | 4/2007 | Numata | 358/1.15 |
| 2007/0177920 A1* | 8/2007 | Katano et al. | 400/76 |

FOREIGN PATENT DOCUMENTS

| | | |
|---|---|---|
| JP | 11-146118 | 5/1999 |
| JP | 11-249848 | 9/1999 |
| JP | 2000-035869 | 2/2000 |
| JP | 2001-105690 | 4/2001 |
| JP | 2002-171252 A | 6/2002 |
| JP | 2003-281100 A | 10/2003 |
| JP | 2004-110561 | 4/2004 |

(Continued)

OTHER PUBLICATIONS

Decision to Grant Patent in JP 2007-187307 dated Aug. 25, 2009, and an English Translation thereof.

*Primary Examiner* — Farid Homayounmehr
*Assistant Examiner* — Suman Debnath
(74) *Attorney, Agent, or Firm* — Buchanan Ingersoll & Rooney PC

(57) ABSTRACT

An authentication server: has user identification information and a password of that user identification information previously stored therein in association with each other; receives user identification information transmitted, the user identification information being determined from information input at and received by an image output apparatus; obtains a password received by an image transmission apparatus used by a user associated with the received user identification information, from that image transmission apparatus after that user identification information is received; determines whether the obtained password and the password stored in the authentication server in association with the received user identification information match; and, if a decision is made that the passwords match, permits the image output apparatus that had sent the received user identification information, to output an image corresponding to image data transmitted from the image transmission apparatus and stored in that image output apparatus in association with that user identification information.

13 Claims, 7 Drawing Sheets

(56) References Cited

FOREIGN PATENT DOCUMENTS

| | | |
|---|---|---|
| JP | 2005-056393 | 3/2005 |
| JP | 2005-59453 A | 3/2005 |
| JP | 2005-175942 | 6/2005 |
| JP | 2006-092373 | 4/2006 |
| JP | 2006-110911 | 4/2006 |
| JP | 2006-146508 | 6/2006 |
| JP | 2006-319459 | 11/2006 |
| JP | 2007-067875 | 3/2007 |
| WO | WO 2005/057907 | 6/2005 |

* cited by examiner

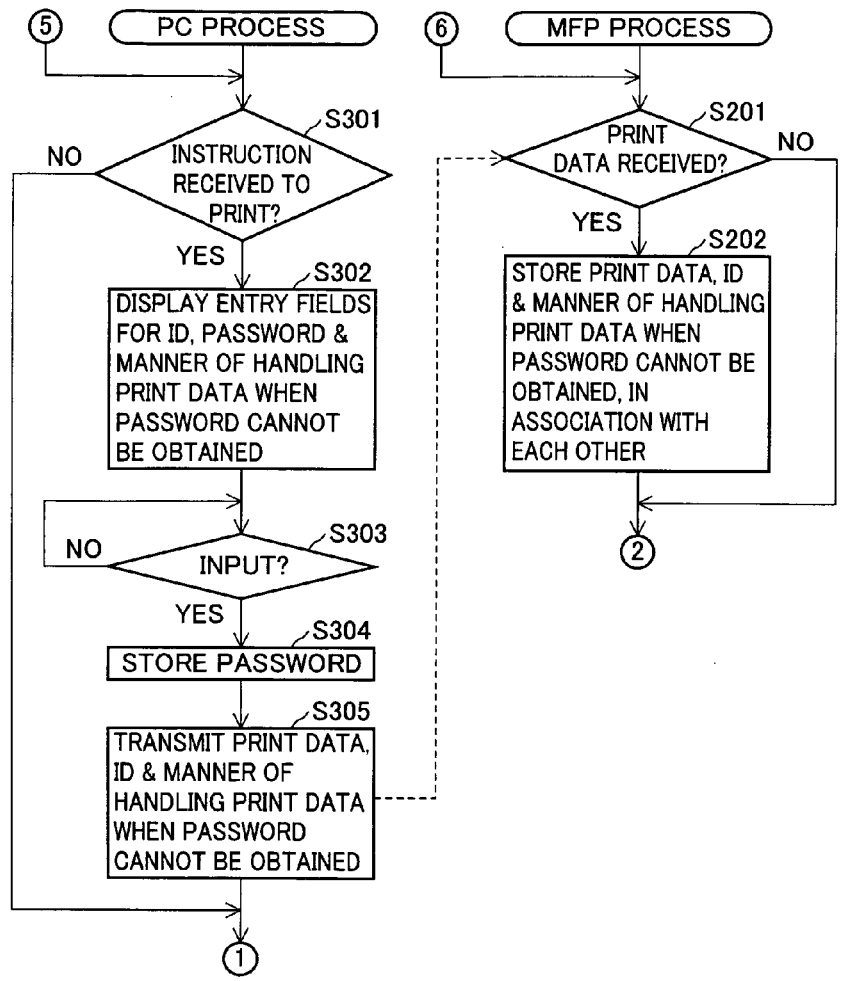

IMAGE OUTPUT AUTHENTICATION SYSTEM, IMAGE OUTPUT AUTHENTICATION SERVER, AND IMAGE OUTPUT AUTHENTICATION METHOD

This application is based on Japanese Patent Application No. 2007-187307 filed with the Japan Patent Office on Jul. 18, 2007, the entire content of which is hereby incorporated by reference.

BACKGROUND OF THE INVENTION

1. Field of the Invention

The present invention relates generally to image output authentication systems, image output authentication servers and image output authentication methods, and particularly to image output authentication systems, image output authentication servers and image output authentication methods suitable for authentication of a user in outputting an image.

2. Description of the Related Art

Conventionally there has been a system employing an IC card or a similar storage medium to provide authentication in printing image data of a classified document or the like to place a restriction on printing the image data to enhance the security of the image data.

Japanese Laid-Open Patent Publication No. 2005-059453, paragraphs 0013 and 0014 discloses that a serial number is read from a memory card attached to an image formation apparatus, whether the serial number is that of a printer thereof is determined, and if they match, and a user code input and a password input are those having been registered, then the user is permitted to copy.

Japanese Laid-Open Patent Publication No. 2002-171252, paragraph 0010 discloses a system in which a physical authentication ID is read from a magnetic card inserted in a printer, a password server obtains a user ID associated with the read physical authentication ID, whether the user has authority is determined, and printing is performed.

Japanese Laid-Open Patent Publication No. 2003-281100, paragraph 0019 discloses a system in which an ID, a means for comparing a password, and a key encrypting and decrypting print data are provided to a key device, and in printing, the key device is inserted into a printer, a password is input, the key device compares the password, and data decrypted with the decryption key of the key device is printed out.

The system of Japanese Laid-Open Patent Publication No. 2005-059453 permits using the image formation apparatus after a memory card is attached and a user code and a password are input. The system thus requires the three steps of attaching a memory card, inputting a user code and inputting a password before an image is output.

The system of Japanese Laid-Open Patent Publication No. 2002-171252 only requires authentication of a user ID associated with a physical authentication ID stored in a magnetic card to permit printing. Authenticating only a user ID, however, is a single security, i.e., has a low security level.

The system of Japanese Laid-Open Patent Publication No. 2003-281100 requires the two steps of inserting a key device and inputting a password to obtain a printout. The system is thus less cumbersome than that of Japanese Laid-Open Patent Publication No. 2005-059453 to obtain a printout. Furthermore the system employs an ID and a password to provide authentication. The system thus provides a double security. While this is a security level equivalent to that of the system of Japanese Laid-Open Patent Publication No. 2005-059453, it is higher than the security level of the system of Japanese Laid-Open Patent Publication No. 2002-171252.

However, the system of Japanese Laid-Open Patent Publication No. 2003-281100 still requires two steps to maintain its security level.

SUMMARY OF THE INVENTION

The present invention has been made to overcome the above disadvantages as described above, and it contemplates an image output authentication system, server and method that can maintain a high level in intensity of authentication and also provide a labor saving authentication process in outputting an image.

To achieve the above object, the present invention in one aspect provides an image output authentication system including an image output apparatus outputting an image, an image transmission apparatus transmitting image data corresponding to the image, and an authentication server authenticating a user.

The image transmission apparatus includes a first user identification information determination unit, a first password input unit and an image transmission unit. The first user identification information determination unit receives information input that allows user identification information to be determined, to determine the user identification information, the user identification information being provided for identifying a user. The first password input unit receives a password input associated with the user identification information determined by the first user identification information determination unit. The image transmission unit transmits to the image output apparatus image data and the user identification information determined by the first user identification information determination unit.

The image output apparatus includes an image reception unit, an image storage unit, a second user identification information determination unit, and a user identification information transmission unit. The image reception unit receives the image data and the user identification information transmitted by the image transmission unit. The image storage unit stores the image data and the user identification information received by the image reception unit, therein in association with each other. The second user identification information determination unit receives information input that allows user identification information to be determined, to determine the user identification information. The user identification information transmission unit transmits to the authentication server the user identification information determined by the second user identification information determination unit.

The authentication server includes a user storage unit, a user identification information reception unit, a password obtaining unit, an authentication unit and an image output permission unit. The user storage unit has the user identification information and a password of that user identification information, previously stored therein in association with each other. The user identification information reception unit receives the user identification information transmitted by the user identification information transmission unit. The password obtaining unit obtains the password received by the first password input unit, from the image transmission apparatus used by a user associated with the user identification information received by the user identification information reception unit, after the user identification information is received. The authentication unit determines whether the password obtained by the password obtaining unit and the password stored in the user storage unit in association with the user identification information received by the user identification information reception unit match. If the authentication unit determines that the passwords match, the image output permission unit permits the image output apparatus that had sent the user identification information received by the user identification information reception unit, to output an image corresponding to the image data stored in the image storage unit of that image output apparatus in association with that user identification information.

The image output apparatus further includes an image output unit outputting the image if the image output permission unit permits outputting the image.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 6 is a first flowchart of an image output authentication process performed in the image output authentication system of the present embodiment.

FIG. 7 shows a screen displayed at a display unit of the PC in the present embodiment and indicating entry fields in which a user ID, a password, and a manner of handling print data when a password cannot be obtained, are input.

DESCRIPTION OF THE PREFERRED EMBODIMENTS

Hereinafter the present invention in embodiments will be described with reference to the drawings. In the figures, identical or like components are identically denoted and will not be described repeatedly.

First Embodiment

Figure 1:
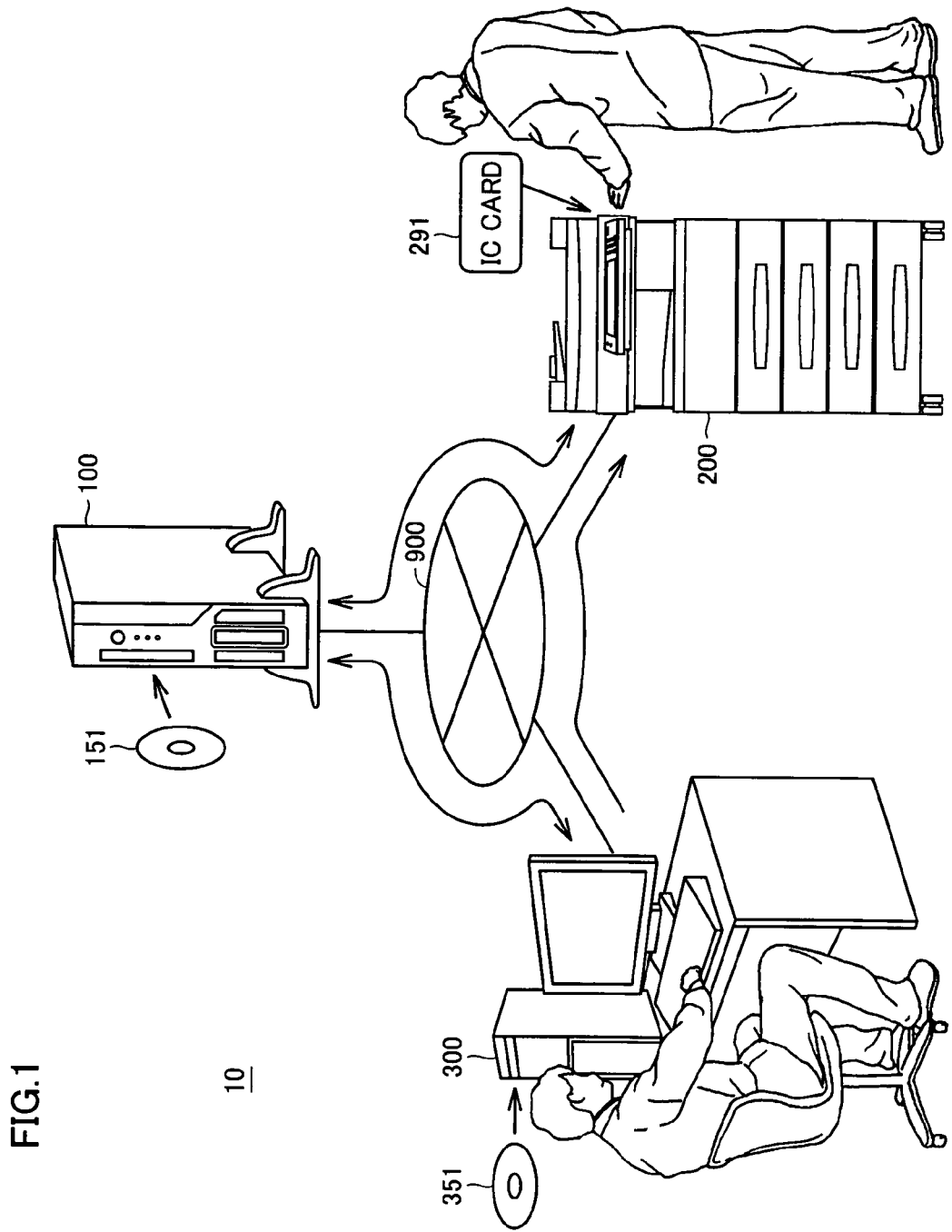
FIG. 1 schematically shows an image output authentication system in an embodiment of the present invention.

FIG. 1 generally shows an image output authentication system 10 in an embodiment of the present invention. With reference to FIG. 1, image output authentication system 10 includes an authentication server 100, a multifunction peripheral (MFP) 200, and a personal computer (PC) 300.

Note that the MFP has a copy function, a printer function, a scanner function and a facsimile function. In the present embodiment the present invention will be described for utilizing the printer function.

Image output authentication system 10 is a system authenticating a user by authentication server 100 when an image corresponding to image data transmitted from PC 300 to MFP 200 is output at MFP 200. Herein an image is a digital image of a document, a line drawing, a drawing, an illustration, a picture, a photograph and the like, and image data corresponds to an image represented in the form of data; it is textual data, document data or image data represented by a vector or in a bit map, and is generated in PC 300 or by the scanner function of MFP 200, externally received external to PC 300 or MFP 200 through a local area network (LAN) port, a universal serial bus (USB) port, an image input terminal or the like, or read from a storage medium to PC 300 or MFP 200.

Note that the storage medium includes a contact or non-contact IC card, a magnetic card, a memory card, a magnetic disk, an optical disk, a magneto-optical disk, and the like.

In the present embodiment PC 300 at least has an image transmission function transmitting image data corresponding to an image on LAN 900 to another apparatus, e.g., MFP 200. MFP 200 at least has a printer function outputting an image. Authentication server 100 at least has an authentication function authenticating a user outputting an image at MFP 200 via LAN 900.

Figure 2:
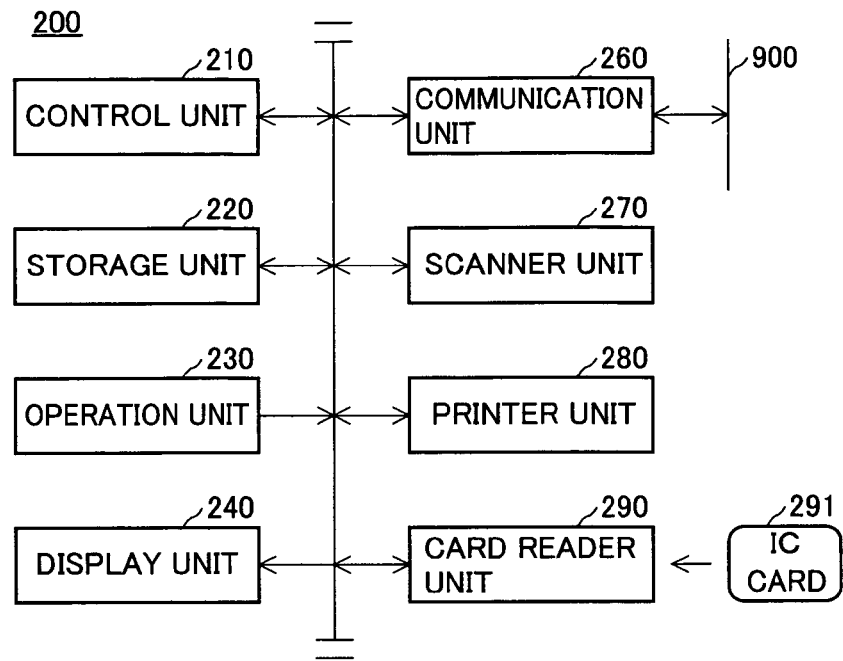
FIG. 2 is a block diagram of a configuration of an MFP in the present embodiment.

FIG. 2 is a block diagram of a configuration of MFP 200 in the present embodiment. With reference to FIG. 2, MFP 200 includes a control unit 210 for generally controlling MFP 200, a storage unit 220 for storing predetermined information, an operation unit 230 for operating MFP 200, a display unit 240 for displaying predetermined information of MFP 200, a communication unit 260 for communicating with an external apparatus on LAN 900, a scanner unit 270 for reading a predetermined image, a printer unit 280 for printing the predetermined image, and a card reader unit 290 for reading predetermined information from an IC card 291.

Storage unit 220 includes a random access memory (RAM) used as a working memory required to execute a program in control unit 210, and a read only memory (ROM) for storing the program executed by control unit 210. Furthermore the RAM receives and stores therein a program and data read via operation unit 230, communication unit 260, scanner unit 270 or card reader unit 290 for performing a predetermined process. Furthermore, a hard disk drive or a memory card may be used as an auxiliary memory device for assisting the memory area of the RAM.

Operation unit 230 includes a plurality of operation buttons for effecting a predetermined function at MFP 200, and a touch panel configured in a display of display unit 240. A button of operation unit 230 and the touch panel of operation unit 230 are operated to input to MFP 200 what operation should be done, which is represented by an operation signal and passed to control unit 210.

Display unit 240 includes a liquid crystal display (LCD) having the display with the touch panel configured therein. The LCD of display unit 240 displays an image received from control unit 210 and indicating a state of MFP 200 and an operation button of the touch panel. Note that while display unit 240 includes the LCD, it may alternatively include an electro-luminescence (EL) display, a plasma display, a surface-conduction electron-emitter display (SED) and/or an other flat panel display (FPD).

Communication unit 260 communicates data with an external apparatus, e.g., authentication server 100 or a similar server, and PC 300 or a similar PC on LAN 900 under a predetermined protocol. Communication unit 260 externally transmits data received from control unit 210 and passes externally received data to control unit 210.

Scanner unit 270 optically reads visible information provided on a surface of a sheet of paper or other items, converts a read image to image data, and passes the image data to control unit 210.

Printer unit 280 receives image data from control unit 210, converts the data to an image, and prints the image on a printing sheet. The printing sheet includes: a sheet of plain paper; a sheet for photograph; overhead projector (OHP) film; and the like.

Card reader unit 290 reads data from non contact IC card 291 placed over card reader unit 290 and passes the read data to control unit 210. While in the present embodiment card reader unit 290 reads data from non contact IC card 291, card reader unit 290 may alternatively read data from a contact IC card, a magnetic card, or a memory card of USB memory or the like.

Control unit 210 is configured of a micro processing unit (MPU) and its auxiliary circuitry. Control unit 210 controls storage unit 220, operation unit 230, display unit 240, communication unit 260, scanner unit 270, printer unit 280 and card reader unit 290 to perform a predetermined process in accordance with a program and data stored in storage unit 220 to process data received from operation unit 230, communication unit 260, scanner unit 270 or card reader unit 290, and cause storage unit 220, display unit 240, communication unit 260 and printer unit 280 to respectively store, display, output and print the processed data.

MFP 200 has a copy function, a printer function, a scanner function, and a facsimile function, as has been described above, which are implemented by each component of NFP 200, i.e., control unit 210, storage unit 220, operation unit 230, display unit 240, communication unit 260, scanner unit 270, printer unit 280 and card reader unit 290 cooperating together.

Figure 3:
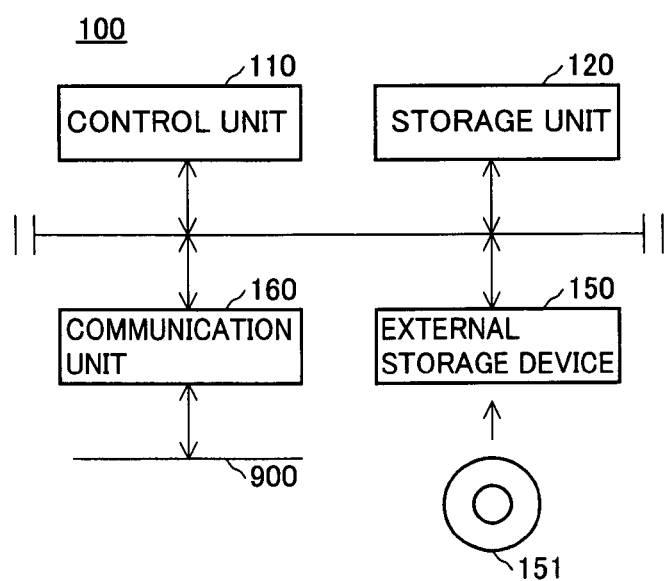
FIG. 3 is a block diagram of a configuration of an authentication server in the present embodiment.

FIG. 3 is a block diagram of a configuration of authentication server 100 in the present embodiment. With reference to FIG. 3, authentication server 100 includes a control unit 110 generally controlling authentication server 100, a storage unit 120 for storing predetermined information, an external storage device 150 assisting storage unit 120 for storing predetermined information, and a communication unit 160 for communicating with an external apparatus on LAN 900.

Storage unit 120 and communication unit 160 are similar to storage unit 220 and communication unit 260, respectively, of MFP 200 described with reference to FIG. 2. Accordingly, they will not be described repeatedly.

External storage device 150 is configured of a hard disk drive, a flexible disk drive, a magneto-optical (MO) disk drive, a compact disc (CD) drive, a digital versatile disk (DVD) drive, a memory card reader/writer, or a similar storage device. External storage device 150 receives predetermined data or a predetermined program from control unit 110 and stores it in a storage medium 151 magnetically, optically or electrically, and reads the data or the program from storage medium 151 and passes it to control unit 110. Storage medium 151 includes: a hard disk, a flexible disk and other similar magnetic disks; a compact disk read only memory (CD-ROM), a compact disk recordable (CD-R), a compact disk rewritable (CD-RW), a digital versatile disk read only memory (DVD-ROM), a digital versatile disk recordable (DVD-R), a digital versatile disk recordable disc (DVD-RW), a digital versatile disk random access memory (DVD-RAM), a DVD+R, a digital versatile disk rewritable (DVD+RW) and other similar optical disks; a magneto-optical (MO) disk; a memory card; a universal serial bus (USB) memory; and the like.

Control unit 110 is similar in configuration to control unit 210 of MFP 200 described with reference to FIG. 2. Control unit 110 controls storage unit 120, external storage device 150 and communication unit 160 to perform a predetermined process in accordance with a program and data stored in storage unit 120 to process data received from external storage device 150 or communication unit 160 and cause storage unit 120 or storage medium 151 of external storage device 150 and communication unit 160 to respectively store and output the processed data.

While in the present embodiment authentication server 100 does not include an operation unit and a display unit, it may include a configuration similar to an operation unit 330 and a display unit 340 described later with reference to FIG. 4.

Figure 4:
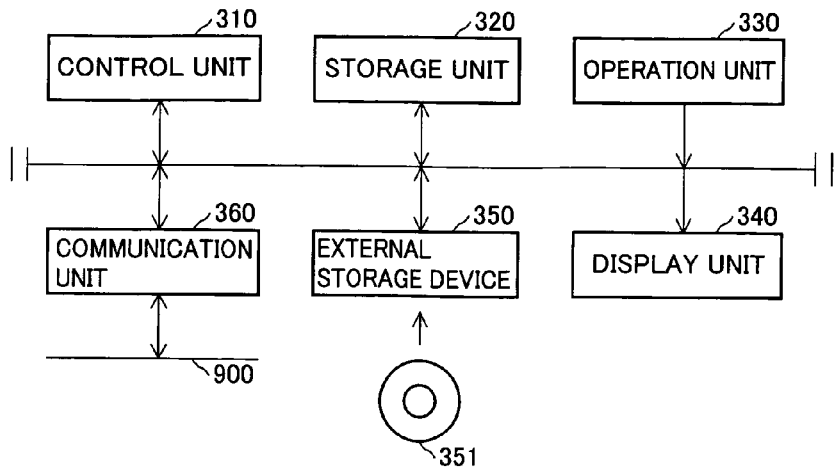
FIG. 4 is a block diagram of a configuration of a PC in the present embodiment.

FIG. 4 is a block diagram of a configuration of PC 300 in the present embodiment. With reference to FIG. 4, PC 300 includes a control unit 310 generally controlling PC 300, a storage unit 320 for storing predetermined information, an operation unit 330 for operating PC 300, a display unit 340 for displaying predetermined information of PC 300, an external storage device 350 assisting storage unit 320 for storing predetermined information, and a communication unit 360 for communicating with an external apparatus on LAN 900.

Storage unit 320 and communication unit 360 are similar to storage unit 220 and communication unit 260, respectively, of MFP 200 described with reference to FIG. 2. Accordingly, they will not be described repeatedly. External storage device 350 is similar to external storage device 150 of authentication server 100 described with reference to FIG. 3. Accordingly, it will not be described repeatedly.

Operation unit 330 includes a keyboard and a mouse. The keyboard and mouse of operation unit 330 are operated to input to PC 300 what operation should be done, which is represented by an operation signal and thus passed to control unit 310.

Display unit 340 includes an LCD which displays an image corresponding to image data received from control unit 310. Note that display unit 340, as well as display unit 240 of MFP 200 described with reference to FIG. 2, may have the LCD replaced with another FPD.

Control unit 310 is similar in configuration to control unit 210 of MFP 200 described with reference to FIG. 2. Control unit 310 controls storage unit 320, operation unit 330, display unit 340, external storage device 350 and communication unit 360 to perform a predetermined process in accordance with a program and data stored in storage unit 320 to process data received from operation unit 330, external storage device 350 or communication unit 360, and cause storage unit 320 or a storage medium 351 of external storage device 350, display unit 340 and communication unit 360 to respectively store, display and output the processed data.

Figure 5:
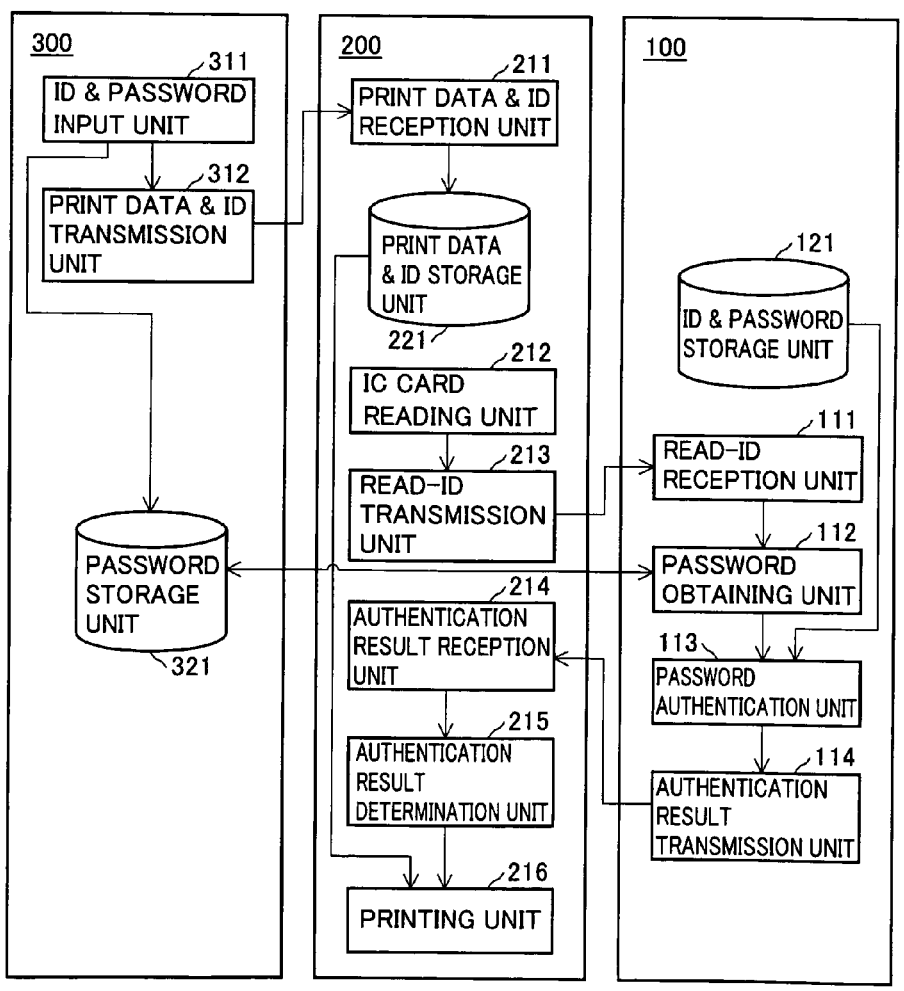
FIG. 5 is a block diagram generally showing a function of the image output authentication system of the present embodiment.

FIG. 5 is a block diagram generally showing a function of image output authentication system 10 in the present embodiment. In the present embodiment, authentication server 100, MFP 200 and PC 300 included in image output authentication system 10 each have a plurality of functions, as will now be described with reference to FIG. 5, and their functions are configured in authentication server 100, MFP 200 and PC 300, respectively, by their respective control units 110, 210 and 310 executing a program of software, which will be described hereinafter with reference to FIGS. 6, 8, 9 and 10. Alternatively, authentication server 100, MFP 200 and PC 300 may each have its functions partially or entirely configured by hardware dedicated thereto.

With reference to FIG. 5, image output authentication system 10 includes authentication server 100, MFP 200 and PC 300, as has been described with reference to FIG. 1.

PC 300 includes an ID and password input unit 311, a print data and ID transmission unit 312, and a password storage unit 321. MFP 200 includes a print data and ID reception unit 211, a print data and ID storage unit 221, an IC card reading unit 212, a read-ID transmission unit 213, an authentication result reception unit 214, an authentication result determination unit 215, and a printing unit 216. Authentication server 100 includes an ID and password storage unit 121, a read-ID reception unit 111, a password obtaining unit 112, a password authentication unit 113, and an authentication result transmission unit 114.

ID and password input unit 311 is configured by control unit 310 and operation unit 330 cooperating together. Print data and ID transmission unit 312 is configured by control unit 310 and communication unit 360 cooperating together. Password storage unit 321 is configured in storage unit 320.

Print data and ID reception unit 211, read-ID transmission unit 213, and authentication result reception unit 214 are configured by control unit 210 and communication unit 260 cooperating together. Print data and ID storage unit 221 is configured in storage unit 220. IC card reading unit 212 is configured by control unit 210 and card reader unit 290 cooperating together. Authentication result determination unit 215 is configured in control unit 210. Printing unit 216 is configured by control unit 210 and printer unit 280 cooperating together.

ID and password storage unit 121 is configured in storage unit 120. Read-ID reception unit 111, password obtaining unit 112, and authentication result transmission unit 114 are configured by control unit 110 and communication unit 160 cooperating together. Password authentication unit 113 is configured in control unit 110.

Initially in authentication server 100 ID and password storage unit 121 has a user ID and a password previously stored therein in association with each other. The user ID is a string of characters and numerals for uniquely identifying a user of image output authentication system 10. The password is a string of characters and numerals used together with the user ID for authenticating the user. The password is previously determined for the user ID by the user or an administrator of the system and subjected to management so that no other person or the like can obtain it.

In PC 300 ID and password input unit 311 receives a user ID and a password input by a user through the keyboard of operation unit 330.

Note that while herein ID and password input unit 311 is adapted to receive a user ID input via a keyboard, PC 300 may alternatively be adapted to include a card reader unit similar to that described with reference to FIG. 2 and from information received via the card reader unit from an IC card a user ID may be determined and thus received.

Furthermore PC 300 may be adapted to include a unit reading a fingerprint, an iris, a palm or a vain of a finger tip, a voiceprint, or like biometric information, which may be input to the unit and from such information a user ID may be determined and thus received.

Furthermore, a user ID may be determined via the keyboard or an IC card and a password may be determined from biometric information.

Furthermore, a user ID and a password that are input via operation unit 330 by a user in logging in PC 300 and are stored in storage unit 320 may be read from storage unit 320 and thus input.

Then password storage unit 321 stores therein the password input via ID and password input unit 311.

Then print data and ID transmission unit 312 operates in response to the user operating operation unit 330 to transmit print data, to transmit on LAN 990 to MFP 200 the print data and the user ID received by ID and password input unit 311.

Herein, the print data is image data corresponding to an image to be printed, that has been converted to page description language (PDL). The PDL is a language for instructing a printer to print. It is, for example, postscript.

The image data that is converted to the print data transmitted to MFP 200 may be: generated by PC 300 and stored in storage unit 320; externally received via communication unit 360; or read via external storage device 350 from storage medium 351. Furthermore, preferably, the print data and user ID transmitted to MFP 200 are encrypted and thus transmitted for enhanced security.

Then in MFP 200 print data and ID reception unit 211 receives the print data and user ID transmitted from print data and ID transmission unit 312 of PC 300 on LAN 900. Print data and ID storage unit 221 stores the print data and user ID received by print data and ID reception unit 211 therein in association with each other.

Subsequently IC card reading unit 212 reads information that allows the user ID to be determined from IC card 291 placed by the user over card reader unit 290 to determine the user ID. IC card 291 has previously stored therein information that allows a user ID of a user possessing IC card 291 to be determined.

While IC card reading unit 212 is adapted to determine a user ID from IC card 291, a user ID may alternatively be determined by a user ID received that is input by a user via operation unit 230.

Furthermore MFP 200 may be adapted to include a unit reading a fingerprint, an iris, a palm or a vain of a finger tip, a voiceprint, or like biometric information, which may be input to the unit and from such information a user ID may be determined.

Then read-ID transmission unit 213 transmits on LAN 900 to authentication server 100 the user ID determined at IC card reading unit 212. Preferably the user ID is encrypted and thus transmitted to authentication server 100 for enhanced security.

Then in authentication server 100 read-ID reception unit 111 receives the user ID transmitted from read-ID transmission unit 213 of MFP 200 on LAN 900.

Then password obtaining unit 112 obtains from PC 300 used by the user associated with the user ID received via read-ID reception unit 111 the password stored in password storage unit 321. Note that if password storage unit 321 is set to allow authentication server 100 to directly read it, password obtaining unit 112 can obtain the password directly from password storage unit 321.

If security is considered and password storage unit 321 is accordingly set to prevent authentication server 100 from directly reading it, however, then the password may be obtained, as follows: Initially, password obtaining unit 112 requests PC 300 used by the user associated with the user ID received by read-ID reception unit 111, to transmit the password. In response to the request from password obtaining unit 112 of authentication server 100, if PC 300 determines that the password stored in password storage unit 321 may be transmitted, the password is transmitted on LAN 900 to authentication server 100. Password obtaining unit 112, receiving the password transmitted from PC 300 on LAN 900, can thus obtain the password indirectly. In either case, if the password is transmitted on LAN 900, preferably it is encrypted and thus transmitted.

Then password authentication unit 113 determines whether the password obtained by password obtaining unit 112 matches the password stored in ID and password storage unit 121 in association with the user ID received by read-ID reception unit 111, to authenticate the password.

Authentication result transmission unit 114 transmits on LAN 900 to MFP 200 an authentication result indicating whether the passwords match. An authentication result transmitted to MFP 200 indicating that the passwords match provides such permission that MFP 200 that had sent the user ID received by read-ID reception unit 111 may output an image corresponding to the print data stored in that MFP 200 at print data and ID storage unit 221 in association with that user ID.

More specifically in MFP 200 authentication result reception unit 214 receives the authentication result transmitted from authentication result transmission unit 114 of authentication server 100 on LAN 900. Authentication result determination unit 215 determines whether the authentication result received by authentication result reception unit 214 indicates that the passwords match.

If authentication result determination unit 215 determines that the authentication result provided in authentication server 100 indicates that the passwords match, i.e., outputting an image is permitted, then printing unit 216 prints an image corresponding to the print data stored in print data and ID storage unit 221.

FIG. 6 is a first flowchart of an image output authentication process performed in image output authentication system 10 of the present embodiment. FIG. 6 indicates a PC process and an MFP process, which are performed by PC 300 and MFP 200, respectively.

Initially in PC 300 at step S301 control unit 310 determines whether a user operating operation unit 330 has input an instruction to print an image. If not (NO at step S301) control unit 310 proceeds to step S311 shown in FIG. 8.

If control unit 310 determines that the instruction to print the image has been input (YES at S301), then control unit 310 proceeds to step S302 to cause display unit 340 to display entry fields for a user ID, a password, and a manner of handling print data when the password cannot be obtained.

FIG. 7 is a screen displayed at display unit 340 of PC 300 in the present embodiment indicating the entry fields for a user ID, a password, and a manner of handling print data when the password cannot be obtained. With reference to FIG. 7, the entry fields include an entry field in which a user ID is input, an entry field in which a password is input, a radio button used to select a manner of handling print data when the password cannot be obtained, and a "print" button operated to determine that what is indicated by the entry fields and the radio button should be input to PC 300 to continue a printing process.

The manner of handling print data when a password cannot be obtained is how print data transmitted from PC 300 to MFP 200 should be handled when authentication server 100 cannot obtain a password from PC 300.

Herein, the manner of handling print data when a password cannot be obtained includes: "immediate deletion" indicating that print data should be deleted immediately; "deletion after time limit is exceeded" indicating that print data should be deleted after a time limit is exceeded; "move to user PC" indicating that print data should be moved from MFP 200 to PC 300 of the user; "move to user box of equipment of interest" indicating that print data should be moved to a user box provided to MFP 200 to which the print data has been transmitted; and "move to user box of anther equipment" indicating that print data should be moved to a user box provided to an MFP different from MFP 200 to which the print data has been transmitted.

Referring again to FIG. 6, at step S303 when the "print" button shown in FIG. 7 is operated, control unit 310 determines whether a user ID, a password, and a manner of handling print data when the password cannot be obtained have been input. If control unit 310 determines that at least one of them is not input (NO at S303) control unit 310 repeats step S303.

By control unit 310 performing steps S302 and S303 and operation unit 330 receiving a user ID and a password, ID and password input unit 311 shown in FIG. 5 is configured in PC 300.

If control unit 310 determines that a user ID, a password, and a manner of handling print data when the password cannot be obtained have all been input (YES at S303), control unit 310 proceeds to step S304 to cause storage unit 320 to store the input password therein.

By control unit 310 performing step S304 and storage unit 320 storing the password therein, password storage unit 321 is configured in PC 300 at storage unit 320.

Then control unit 310 proceeds to step S305 to convert the image data corresponding to the image that an instruction is issued at step S301 to print into print data, and control communication unit 360 to transmit on LAN 900 to MFP 200 the print data, the user ID, and the manner of handling the print data when the password cannot be obtained. Subsequently control unit 310 proceeds to step S311 shown in FIG. 8.

By control unit 310 performing step S305 and communication unit 360 transmitting the print data and the user ID to MFP 200, print data and ID transmission unit 312 shown in FIG. 5 is configured in PC 300.

Then in MFP 200 at step S201 control unit 210 determines whether the print data, the user ID, and the manner of handling the print data when the password cannot be obtained, that are transmitted from PC 300 on LAN 900 have been received. If not (NO at S201) then control unit 210 proceeds to step S212 shown in FIG. 8.

By control unit 210 performing step S201 and communication unit 260 receiving the print data and the user ID from PC 300, the FIG. 5 print data and ID reception unit 211 is configured.

If control unit 210 determines that the print data, the user ID, and the manner of handling the print data when the password cannot be obtained have been received (YES at S201) then control unit 210 proceeds to step S202 to associate the received print data, user ID, and manner of handling the print data when the password cannot be obtained with each other, and cause storage unit 220 to store them therein. Control unit 210 then proceeds to step S211 shown in FIG. 8.

By control unit 210 performing step S202 and storage unit 220 storing the received print data and user ID therein, print data and ID storage unit 221 is configured in UP 200 at storage unit 220.

Figure 8:
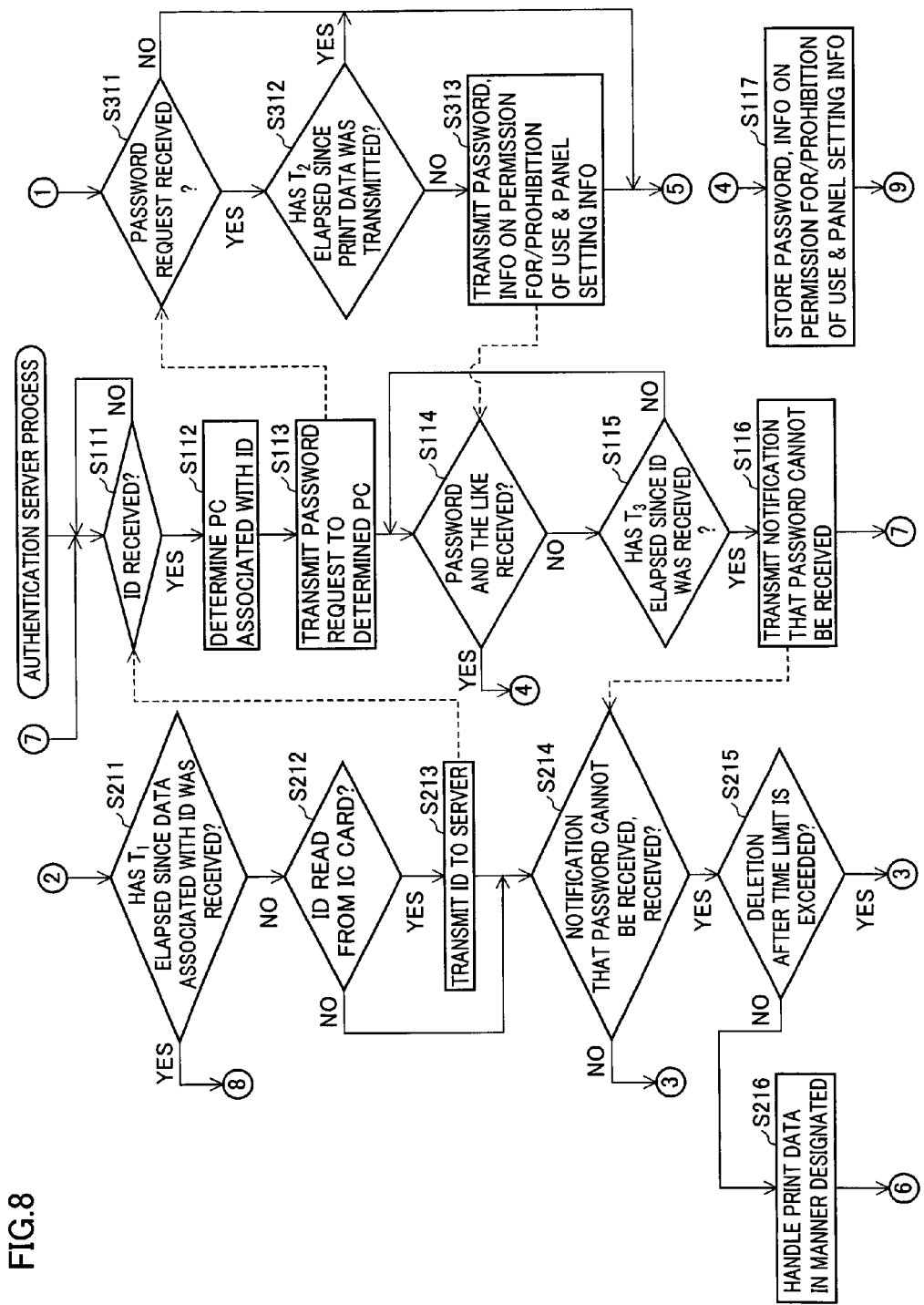
FIGS. 8 and 9 are second and third flowcharts, respectively, of the image output authentication process performed in the image output authentication system of the present embodiment.

FIG. 8 is a second flowchart of the image output authentication process performed by image output authentication system 10 in the present embodiment. FIG. 8 shows an authentication server process, which is performed by authentication server 100.

In MFP 200 at step S211 control unit 210 determines whether a time $T_1$ has elapsed since the print data stored in storage unit 220 in association with the user ID of interest was received. Time $T_1$ is a predetermined image output time limit. More specifically, when MFP 200 receives the print data, time $T_1$ starts, and when time $T_1$ expires, the print data is deleted. Time $T_1$ is, for example, a period of 10 minutes.

In other words, after the user transmits print data from PC 300 to MFP 200 and before time $T_1$ elapses, the user must obtain permission from authentication server 100 to print, to output at MFP 200 an image corresponding to the print data. As such, if a user who has IC card 291 stolen or has lost it and thus currently does not have it with him/her transmits print data to MFP 200, and image output time limit $T_1$ is exceeded, the print data is deleted at step S245 shown in FIG. 9, as will be described hereinafter, so that if IC card 291 is obtained by a third party the third party cannot use the card for an improper purpose to print the image corresponding to the print data. This can provide the print data with a higher level of security than when the print data will remain indefinitely.

Figure 9:
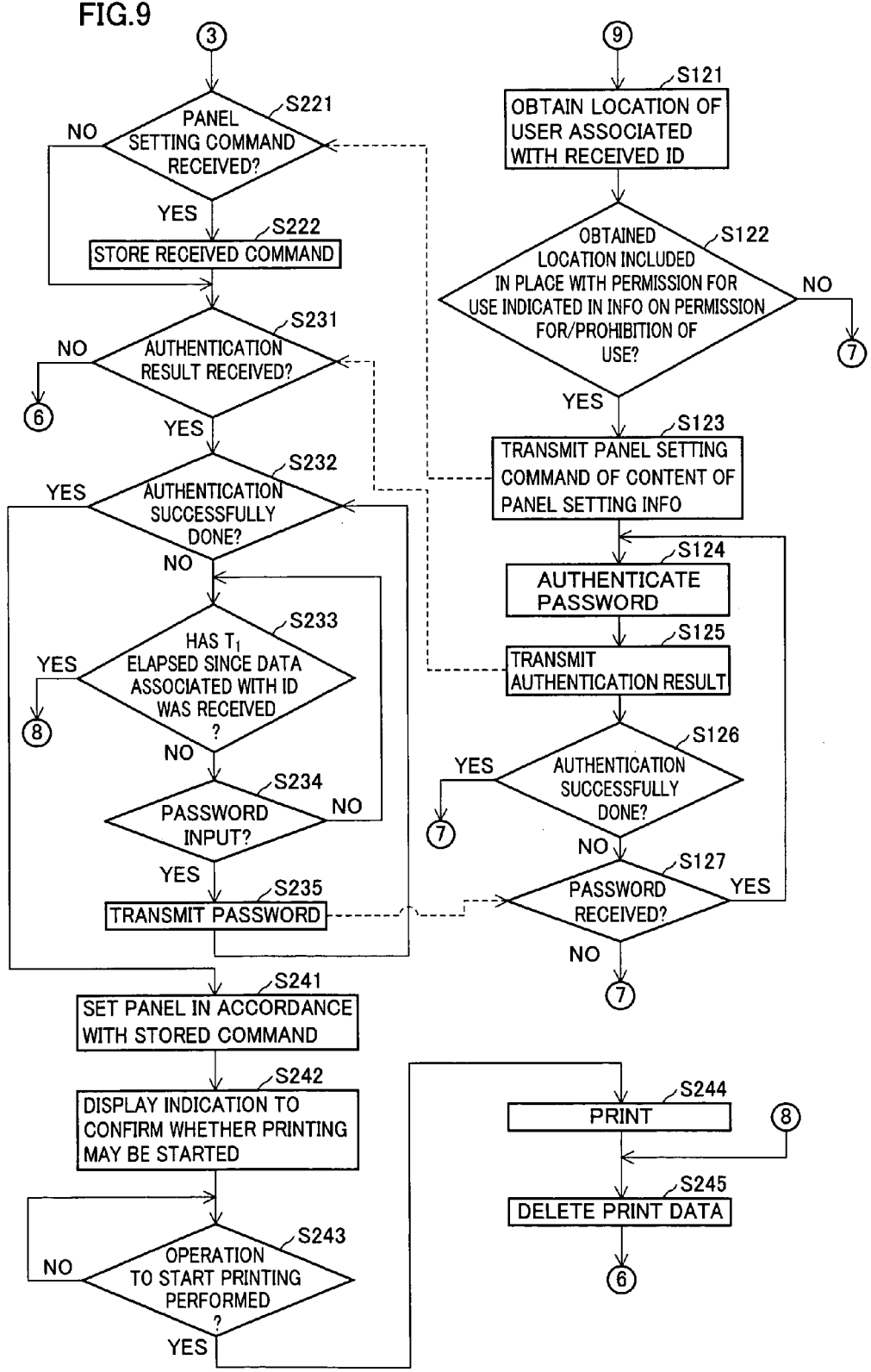

If control unit 210 determines that time $T_1$ has elapsed since the print data was received (YES at S211) then control unit 210 proceeds to step S245 shown in FIG. 9. In the FIG. 9 step S245, as will be described hereinafter, control unit 210 deletes from storage unit 220 the print data stored in storage unit 220 at step S202.

In other words, the print data is received, and if thereafter time $T_1$ elapses, the FIG. 9 step S 244 is not performed, i.e., the image is not printed, and the FIG. 9 step S 245 is instead performed to delete the print data.

If control unit 210 determines that time $T_1$ has not yet elapsed since the print data was received (NO at S211) then control unit 210 proceeds to step S212 to determine whether the user places IC card 291 over card reader unit 290, whether information that allows a user ID to be determined is read from IC card 291, and whether a user ID is determined from that information.

By control unit 210 performing step S212 and card reader unit 290 determining a user ID, IC card reading unit 212 shown in FIG. 5 is configured.

If control unit 210 determines that the information that allows a user ID to be determined is not read (NO at S212) then control unit 210 proceeds to step S214.

If control unit 210 determines that the information that allows a user ID to be determined has been read (YES at S212) then control unit 210 proceeds to step S213 to control communication unit 260 to transmit the user ID that has been determined at step S212 to authentication server 100 on LAN 900. Subsequently control unit 210 proceeds to step S214.

By control unit 210 performing step S213 and communication unit 260 transmitting the user ID to authentication server 100, read-ID transmission unit 213 shown in FIG. 5 is configured in MFP 200.

Then in authentication server 100 at step S111 control unit 110 determines whether communication unit 160 has received the user ID transmitted from MFP 200 on LAN 900.

By control unit 110 performing step S111 and communication unit 160 receiving the user ID from MFP 200, read-ID reception unit 111 shown in FIG. 5 is configured.

If control unit 110 determines that the user ID is not received (NO at S111) then control unit 110 repeats step S111.

If control unit 110 determines that the user ID is received (YES at S111) then control unit 110 proceeds to step S112 to determine PC 300 associated with the user ID received at step S111.

More specifically, in the present embodiment, storage unit 120 has a user ID and an Internet Protocol (IP) address identifying a PC used by the user associated with that user ID, previously stored therein in association with each other. Control unit 110 reads the IP address stored in storage unit 120 in association with the user ID to determine PC 300 associated with the user ID. Note that the information stored in storage unit 120 for identifying a PC is not limited to an IP address; it may be other information that can identify a PC, such as a Media Access Control (MAC) address.

Then at step S113 control unit 110 controls communication unit 160 to transmit a password request, which is information for requesting that a password should be transmitted, on LAN 900 to PC 300 determined at step S112.

Then in PC 300 at step S311 control unit 310 determines whether communication unit 360 has received the password request transmitted from authentication server 100 on LAN 900. If control unit 310 determines that the password request is not received (NO at S311) control unit 310 returns to step S301.

If control unit 310 determines that the password request has been received (YES at S311) control unit 310 proceeds to step S312 to determine whether a time $T_2$ has elapsed since the print data was transmitted at the FIG. 6 step S305 to MFP 200. Time $T_2$ is a predetermined password transmission time limit. More specifically, when PC 300 transmits the print data, time $T_2$ starts, and once time $T_2$ has expired, a password is not transmitted. Time $T_2$ is shorter than image output time limit $T_1$. Time $T_2$ is, for example, a period of five minutes.

In other words, after the user transmits the print data from PC 300 to MFP 200 and before time $T_2$ elapses, the user must place IC card 291 over MFP 200 so that authentication server 100 obtains a password from PC 300. As such, if a user who has IC card 291 stolen or has lost it and thus currently does not have it with him/her transmits print data to MFP 200, and password transmission time limit $T_2$ is exceeded, a password is not transmitted from PC 300 to authentication server 100 at step S313, as will be described hereinafter, so that if IC card 291 is obtained by a third party the third party cannot use the card for an improper purpose to print the image corresponding to the print data, unless the password is input to MFP 200 at step S234 of FIG. 9 described later. This can provide the print data with a higher level of security than when authentication server 100 can obtain the password from PC 300 indefinitely.

If control unit 310 determines that time $T_2$ has elapsed since the print data was transmitted (YES at S312) then control unit 310 returns to step S301.

If control unit 310 determines that time $T_2$ has not yet elapsed since the print data was transmitted (NO at S312) then control unit 310 proceeds to step S313 to read the password stored in storage unit 320 at the FIG. 6 step S304, and information on permission for/prohibition of use and panel setting information previously stored in storage unit 320, and control communication unit 360 to transmit the read password, and information on permission for/prohibition of use and panel setting information to authentication server 100 on LAN 900. Subsequently control unit 310 returns to step S301.

In other words, the print data is transmitted to MFP 200, and if thereafter time $T_2$ elapses, the password is not transmitted at step S313.

The information on permission for/prohibition of use is information indicating a place where a user is permitted to use an MFP that is installed therein when the user resides therein.

For example, assume that a company has an office A and an office B and that when a user 1 resides at office A user 1 is permitted to use an MFP installed in the place where the user resides. In that case, the information on permission for/prohibition of use is information indicating office A. If user 1 resides at office A, the user can use the MFP installed in office A and cannot use an MFP installed in office B. If user 1 resides at office B the user can use neither the MFP installed in office A nor that installed in office B.

Furthermore, assume that when a user 2 resides at either one of offices A and B and the user is permitted to use an MFP installed in the place where the user resides. In that case, the information on permission for/prohibition of use is information indicating offices A and B. When user 2 resides at office A, the user can use the MFP installed in office A and cannot use that installed in office B. When user 2 resides at office B, the user cannot use the MFP installed in office A and can use that installed in office B.

In other words, if a user is permitted to use the MFP in office A when the user resides at office A, the information on permission for/prohibition of use includes information indicating office A, and if a user is permitted to use the MFP in office B when the user resides at office B, the information on permission for/prohibition of use includes information indicating office B.

Furthermore the panel setting information is used to customize for a user of interest an indication displayed on the touch panel of operation unit 230 of MFP 200.

Then in authentication server 100 at step S114 control unit 110 determines whether communication unit 160 has received the password, information on permission for/prohibition of use and panel setting information transmitted from PC 300 on LAN 900. If so (YES at S114) control unit 110 causes storage unit 120 to store the received password, information on permission for/prohibition of use and panel setting information therein. Subsequently, control unit 110 proceeds to step S121 shown in FIG. 9.

By control unit 110 performing steps S113 and 114, communication unit 160 transmitting the password request, and the password being received, the FIG. 5 password obtaining unit 112 is configured.

If control unit 110 determines that the password, information on permission for/prohibition of use and panel setting information are not received (NO at S114) then control unit 110 proceeds to step S115 to determine whether a time $T_3$ has elapsed since the user ID was received at step S111. Time $T_3$ is a time limit starting when authentication server 100 requests PC 300 to transmit a password. When time $T_3$ expires, obtaining the password is forgone. Time $T_3$ is for example 10 seconds.

More specifically, once password transmission time limit $T_2$ has elapsed, PC 300 is prevented from transmitting a password to authentication server 100. Accordingly, to prevent authentication server 100 having issued a request to transmit the password from indefinitely awaiting the password transmitted from PC 300, obtaining the password from PC 300 is forgone once time $T_3$ has elapsed.

If control unit 110 determines that time $T_3$ has not yet elapsed since the user ID was received (NO at S115) then control unit 110 returns to step S114.

If control unit 110 determines that time $T_3$ has elapsed since the user ID was received (YES at S115) then control unit 110 proceeds to step S116 to control communication unit 160 to transmit on LAN 900 to MFP 200 notification that the password cannot be received. This notification is information which notifies MFP 200 that a password cannot be received from PC 300, and includes information allowing the user ID received at step S111 to be determined. Subsequently, control unit 110 returns to step S111.

Then in MFP 200 at step S214 control unit 210 determines whether communication unit 260 has received the notification transmitted from authentication server 100 on LAN 900. If control unit 210 determines that the notification is not received (NO at S214) control unit 210 proceeds to step S221 shown in FIG. 9.

If control unit 210 determines that the notification is received (YES at S214) control unit 210 proceeds to step S215 to determine whether the manner of handling the print data when the password cannot be obtained, that is stored at the FIG. 6 step S202 in storage unit 220 in association with the user ID determined by the received notification, is "deletion after time limit is exceeded" described with reference to FIG. 7. If so (YES at S215) control unit 210 proceeds to step S221.

Otherwise (NO at S215), then control unit 210 proceeds to step S216 to handle the print data stored at step S202 in storage unit 220 in association with the user ID that is determined by the notification received at step S214, as shown in FIG. 6, in the manner of handling the print data when the password cannot be obtained, that is stored in storage unit 220 in association with that user ID. Subsequently control unit 210 returns to step S201 of FIG. 6.

More specifically, if the manner of handling the print data when the password cannot be obtained is "immediate deletion", then control unit 210 deletes the print data from storage unit 220. If it is "move to user PC" then control unit 210 controls communication unit 260 to transmit the print data to PC 300 that has transmitted the print data at step S201, and deletes the print data from storage unit 220.

If it is "move to user box of equipment of interest" then control unit 210 moves the print data to a user box of the user associated with the user ID that is provided in MFP 200 at storage unit 220. If it is "move to user box of anther equipment" then control unit 210 controls communication unit 260 to transmit the print data to a user box of the user associated with the user ID that is provided in anther designated MFP at a storage unit, and deletes the print data from storage unit 220.

FIG. 9 is a third flowchart of the image output authentication process performed in image output authentication system 10 in the present embodiment. With reference to FIG. 9, in authentication server 100 at step S121 control unit 110 obtains the location of the user associated with the user ID received at step S111.

More specifically, control unit 110 controls communication unit 160 to inquire of an entrance/exit management system which area of offices the user associated with a user ID has entered/exited. More specifically, a user places an IC card over a card reader provided in each area of each office, and the entrance/exit management system reads from the IC card a user ID or similar information that allows the user to be determined, to monitor for each office which area in the office the user has entered/exited. Communication unit 160 thus obtains a response from the entrance/exit management system and hence the location of the user. Any system other than the entrance/exit management system that can obtain the location of the user may alternatively be used.

Furthermore, if the information on permission for/prohibition of use is information indicating a place for each office, a system capable of obtaining the location of a user that can determine the location of the user at least office by office suffices. If the information on permission/prohibition of use is information indicating a place for each area in an office, then, a system capable of obtaining the location of a user that can determine the location of the user at least area by area in the office suffices.

Then control unit 110 proceeds to step S122 to determine whether the location of the user obtained at step S121 is a place with a permission for use that is included in the information on permission for/prohibition of use for the user that has been received at the FIG. 8 step S114. If not (NO at S122) control unit 110 returns to step S111 shown in FIG. 8.

If so (YES at S122) then control unit 110 proceeds to step S123 to control communication unit 160 to transmit a panel setting command on LAN 900 to MFP 200 to set an indication of the touch panel of operation unit 230 of MFP 200 to be what is indicated by the panel setting information received at the FIG. 8 step S114. Subsequently control unit 110 proceeds to step S124.

Then in MFP 200 at step S221 control unit 210 determines whether communication unit 260 has received the panel setting command transmitted from authentication server 100 on LAN 900. If not (NO at S221) then control unit 210 proceeds to step S231.

Otherwise (YES at S221) control unit 210 proceeds to step S222 to cause storage unit 220 to store the received panel setting command therein.

Furthermore in authentication server 100 at step S124 control unit 110 determines whether the password received at the FIG. 8 step S114 and that previously stored in storage unit 120 in association with the user ID received at step S111 match to authenticate the password.

By control unit 110 performing step S124, password authentication unit 113 shown in FIG. 5 is configured.

Then at step S125 control unit 110 controls communication unit 160 to transmit on LAN 900 to MFP 200 information indicating an authentication result indicating whether at step S124 the passwords have matched.

By control unit 110 performing step S125 and communication unit 160 transmitting a password authentication result to MFP 200, authentication result transmission unit 114 shown in FIG. 5 is configured.

Then at step S126 control unit 110 determines whether at step S124 the passwords have matched and the password has successfully been authenticated. If so (YES at S126) then control unit 110 proceeds to step S111 shown in FIG. 8. Otherwise (NO at S126) then control unit 110 proceeds to step S127.

Then in MFP 200 at step S231 control unit 210 determines whether communication unit 260 has received the authentication result transmitted from authentication server 100 on LAN 900. If not (NO at S231) then control unit 210 returns to step S201 of FIG. 6.

By control unit 210 performing step S231 and communication unit 260 receiving the password authentication result from authentication server 100, authentication result reception unit 214 shown in FIG. 5 is configured.

If the authentication result has been received (YES at S231) then control unit 210 proceeds to step S232 to determine whether the authentication result received at step S231 indicates that authentication server 100 has succeeded in authenticating the password.

By control unit 210 performing step S232, authentication result determination unit 215 shown in FIG. 5 is configured.

If control unit 210 determines that the authentication result indicates that authentication server 100 has succeeded in authenticating the password (YES at S232) then control unit 210 proceeds to step S241 to control display unit 240 to set the indication on the touch panel of operation unit 230 in accordance with the panel setting command stored in storage unit 220 at step S222.

Then control unit 210 proceeds to step S242 to control display unit 240 to display an indication on the touch panel to confirm whether printing may be started. Control unit 210 proceeds to step S243 to determine whether a start button of operation unit 230 is operated by the user to start printing.

If not (NO at S243) then control unit 210 repeats step S243. Note that if at the time the number of sheets to be printed, the size of the sheets, the scaling factor for printing, the layout for printing, and/or an other setting associated with how the printing should be done is/are changed, the user operates operation unit 230 to introduce such change and control unit 210 in response accordingly change how the printing should be done.

If control unit 210 determines that the start button is pressed to perform an operation to start printing (YES at S243) then control unit 210 proceeds to step S244 to control printer unit 280 to print on a printing sheet the image corresponding to the print data stored in storage unit 220 at step S202.

By control unit 210 performing step S244 and printer unit 280 printing the image corresponding to the print data, printing unit 216 of FIG. 5 is configured.

Then control unit 210 proceeds to step S245 to delete from storage unit 220 the print data stored in storage unit 220 at step S202. Subsequently control unit 210 returns to step S201 of FIG. 6.

If control unit 210 determines that the authentication result does not indicate that the password has successfully been authenticated, i.e., the authentication result indicates a failed password authentication (NO at S232) then control unit 210 proceeds to step S233 to determine whether time $T_1$ has elapsed since the print data associated with the user ID for which a password has not successfully been authenticated was received at the FIG. 6 step S201. If so (YES at S233) then control unit 210 proceeds to step S245.

In other words, the print data is received and if thereafter time $T_1$ elapses, then control 210 does not proceed to step S244 to print an image; control unit 210 instead proceeds to step S245 to delete the print data.

If control unit 210 determines that time $T_1$ has not yet elapsed since the print data was received (NO at S233) then control unit 210 proceeds to step S234 to control display unit 240 to display an indication on the touch panel to urge the user to input a password, and determine whether the password has been input via operation unit 230. If the control unit 210 determines that the password is not input (NO at S234) then control unit 210 returns to step S233.

If the control unit 210 determines that the password has been input (YES at S234) then control unit 210 proceeds to step S235 to control communication unit 160 to transmit on LAN 900 to authentication server 100 the password input at step S234.

Then in authentication server 100 at step S127 control unit 110 determines whether communication unit 160 has received the password transmitted from MFP 200 on LAN 900. If not (NO at S127) then control unit 110 returns to step S111 of FIG. 8.

Otherwise (YES at S127) then control unit 110 returns to step S124 to again authenticate the password.

Thus, as has been described above, image output authentication system 10 of the present embodiment includes MFP 200 printing an image, PC 300 transmitting print data corresponding to the image, and authentication server 100 authenticating a user, as has been described with reference to FIG. 1.

As has been described for the FIG. 5 ID and password input unit 311 and the FIG. 6 steps S302 and S303, PC 300 receives information that allows a user ID to be determined that is input via the keyboard of operation unit 330 for identifying a user, the user ID is determined, and PC 300 receives a password associated with the determined user ID that is input via the keyboard of operation unit 330. As has been described for the FIG. 5 print data and ID transmission unit 312 and the FIG. 6 step S305, PC 300 transmits to MFP 200 image data that has been converted into print data, and the determined user ID.

As has been described for the FIG. 5 print data and ID reception unit 211 and the FIG. 6 step S201, MFP 200 receives the print data and user ID transmitted by PC 300. As has been described for the FIG. 5 print data and ID storage unit 221 and the FIG. 6 step S202, MFP 200 causes its storage unit 220 to store the received print data and user ID therein in association with each other.

As has been described for the FIG. 5 ID card reading unit 212 and the FIG. 8 step S212, MFP 200 receives information that allows a user ID to be determined that is input from card reader unit 290 and the user ID is determined. As has been described for the FIG. 5 read-ID transmission unit 213 and the FIG. 8 step S213, MFP 200 transmits the determined user ID to authentication server 100.

As has been described for the FIG. 5 ID and password storage unit 121 and the FIG. 9 step S124, authentication server 100 previously causes its storage unit 120 to store the user ID and the password of that user ID therein in association with each other. As has been described for the FIG. 5 read-ID reception unit 111 and the FIG. 8 step S111, authentication server 100 receives the user ID transmitted by MFP 200.

As has been described for the FIG. 5 password obtaining unit 112 and the FIG. 8 steps S112-S114, authentication server 100 obtains the password input at PC 300 used by the user associated with the received user ID, from that PC 300 after the user ID is received from MFP 200.

As has been described for the FIG. 5 password authentication unit 113 and the FIG. 9 step S124, authentication server 100 determines whether the obtained password and the password stored in storage unit 120 in association with the received user ID match. As has been described for the FIG. 5 authentication result transmission unit 114, authentication result reception unit 214 and authentication result determination unit 215, and the FIG. 9 steps S125, S231 and S232, authentication server 100 transmits an authentication result to MFP 200 and if a decision is made from the authentication result that the passwords match, such permission is provided that MFP 200 that had sent the user ID received may output an image corresponding to the print data stored in MFP 200 at storage unit 220 in association with that user ID.

As has been described for the FIG. 5 printing unit 216 and the FIG. 9 step S244, if outputting the image is permitted, MFP 200 prints the image on a printing sheet.

Thus in image output authentication system 10 a password is obtained from PC 300 that has transmitted print data to MFP 200 and a user ID and the password are used to provide authentication. If the authentication is successfully done, MFP 200 prints an image. Image output authentication system 10 thus allows a user ID and a password to be used to maintain a high level in intensity of security for authentication, and can also eliminate the necessity of inputting a password at MFP 200. Image output authentication system 10 can thus maintain a high level in intensity of authentication and also provide a labor saving authentication process in outputting an image.

Furthermore, as has been described at the FIG. 9 steps S232 and S234, if outputting the image is not permitted, MFP 200 receives the password input that is associated with the determined user ID. As has been described at the FIG. 9 step S127, authentication server 100 obtains the input password from MFP 200 that is not permitted to output the image.

Thus if PC 300 or LAN 900 has some trouble and a password thus cannot be obtained from PC 300, a password input at MFP 200 allows a decision to be made on whether the password match, and if so, an image is printed. Thus if a password cannot be obtained, an image can nonetheless be printed with a high level in intensity of security maintained.

Furthermore, as has been described at the FIG. 8 steps S211 and S233, MFP 200 receives the print data, and if thereafter time $T_1$ elapses, then thereafter MFP 200 does not print the image. This can provide a higher level of security than when an image can be output even after time $T_1$ has elapsed.

Furthermore, as has been described at the FIG. 8 step S113, authentication server 100 requests PC 300 that is associated with the received user ID to transmit a password. As has been described at the FIG. 8 step S313, in response to the request from authentication server 100, PC 300 transmits the input password. As has been described at the FIG. 8 step S114, authentication server 100 receives the password transmitted by PC 300. This ensures that the password can be obtained efficiently.

Furthermore, as has been described at the FIG. 8 step S312, PC 300 transmits the print data and if thereafter time $T_2$ elapses, then thereafter the password is not transmitted. This can provide a higher level of security than when the password is transmitted even after time $T_2$ has elapsed.

Furthermore, as has been described at the FIG. 6 step S305, when PC 300 transmits the print data, PC 300 transmits to MFP 200 a manner of handling the print data to prevent the print data from leaking when the password cannot be obtained. As has been described at the FIG. 8 step S216, if the password cannot be obtained, MFP 200 follows the manner received from PC 300 to handle the print data stored in MFP 200.

Thus if the password is not obtained and the image is not output, the print data can be handled in a manner to prevent the print data from leaking when the password cannot be obtained. The print data can thus be enhanced in security.

Furthermore, as has been described at the FIG. 8 step S112, authentication server 100 stores the user ID and an IP address that can identify PC 300 used by the user associated with that user ID, in association with each other. As has been described at the FIG. 8 steps S113 and S114, authentication server 100 obtains a password from PC 300 of the IP address stored in authentication server 100 in association with the user ID. This ensures that a password can be obtained from PC 300 associated with a user ID.

Furthermore, as has been described at the FIG. 9 step S125, authentication server 100 transmits an authentication result indicating whether a decision is made that passwords match. As has been described at the FIG. 9 step S231, MFP 200 receives the authentication result transmitted by authentication server 100. As has been described at the FIG. 9 step S232, MFP 200 determines whether the received authentication result indicates that a decision is made that the passwords match. As has been described at the FIG. 9 step S244, if MFP 200 determines that the received authentication result indicates that a decision is made that the passwords match (i.e., YES at step S232), such determination is regarded as a permission to output the image and MFP 200 prints the image. Thus, the passwords match, which ensures that a permission to output an image is transmitted to MFP 200.

As has been described at the FIG. 8 step S114, when authentication server 100 obtains the password from PC 300, authentication server 100 obtains panel setting information from PC 300 for setting MFP 200. As has been described at the FIG. 9 steps S123, S221, S222 and S241, if authentication server 100 permits MFP 200 to output the image (i.e., YES at step S232), a process is performed to set MFP 200 in accordance with the obtained setting information. Thus allows MFP 200 to be set from PC 300.

As has been described at the FIG. 9 steps S123, S221, S222 and S241, authentication server 100 performs a process in accordance with the panel setting information to set an indication of the touch panel of MFP 200 to correspond to the user. This allows an indication of the touch panel of MFP 200 that corresponds to the user to be set from PC 300.

As has been described at the FIG. 8 step S117, authentication server 100 performs a process to set what information on permission for/prohibition of use indicates. The information on permission for/prohibition of use indicates a place with a permission for use. In the place with the permission for use, a user is permitted to use MFP 200 when the user resides there. As has been described at the FIG. 9 step S121, authentication server 100 obtains the location of the user. As has been described at the FIG. 9 step S122, authentication server 100 determines whether the location of the user that is obtained is included in the place with the permission for use that is indicated in the information on permission for/prohibition of use. As has been described at the FIG. 9 step S122, if not (NO at S122), the permission that has once been provided to output the image is cancelled.

Thus if outputting an image is permitted depending on the location of the user, and the location of the user that is obtained is not included in the place with the permission for use that is indicated in the information on permission for/prohibition of use, outputting the image can be prevented. Thus when the user is not present at the place with the permission for use that is indicated by the information on permission for/prohibition of use the image is not output and its security can further be enhanced.

As has been described for the FIGS. 2 and 5 IC card reading unit 212 and the FIG. 8 step S212, MFP 200 receives information that allows a user ID to be determined that is input from IC card 291 having the information stored therein. It is easy to store in IC card 291 the information that allows a user ID to be determined, and it is also easy to receive such information input from IC card 291. The user ID can thus be readily determined.

As has been described for the FIG. 5 print data and ID transmission unit 312, PC 300 stores in storage unit 320 image data that has been converted into print data. As has been described for the FIG. 5 print data and ID transmission unit 312 and the FIG. 6 step S305, PC 300 transmits the print data stored in storage unit 320. As has been described with reference to FIG. 2, MFP 200 prints an image on a printing sheet to output the image.

Second Embodiment

Figure 10:
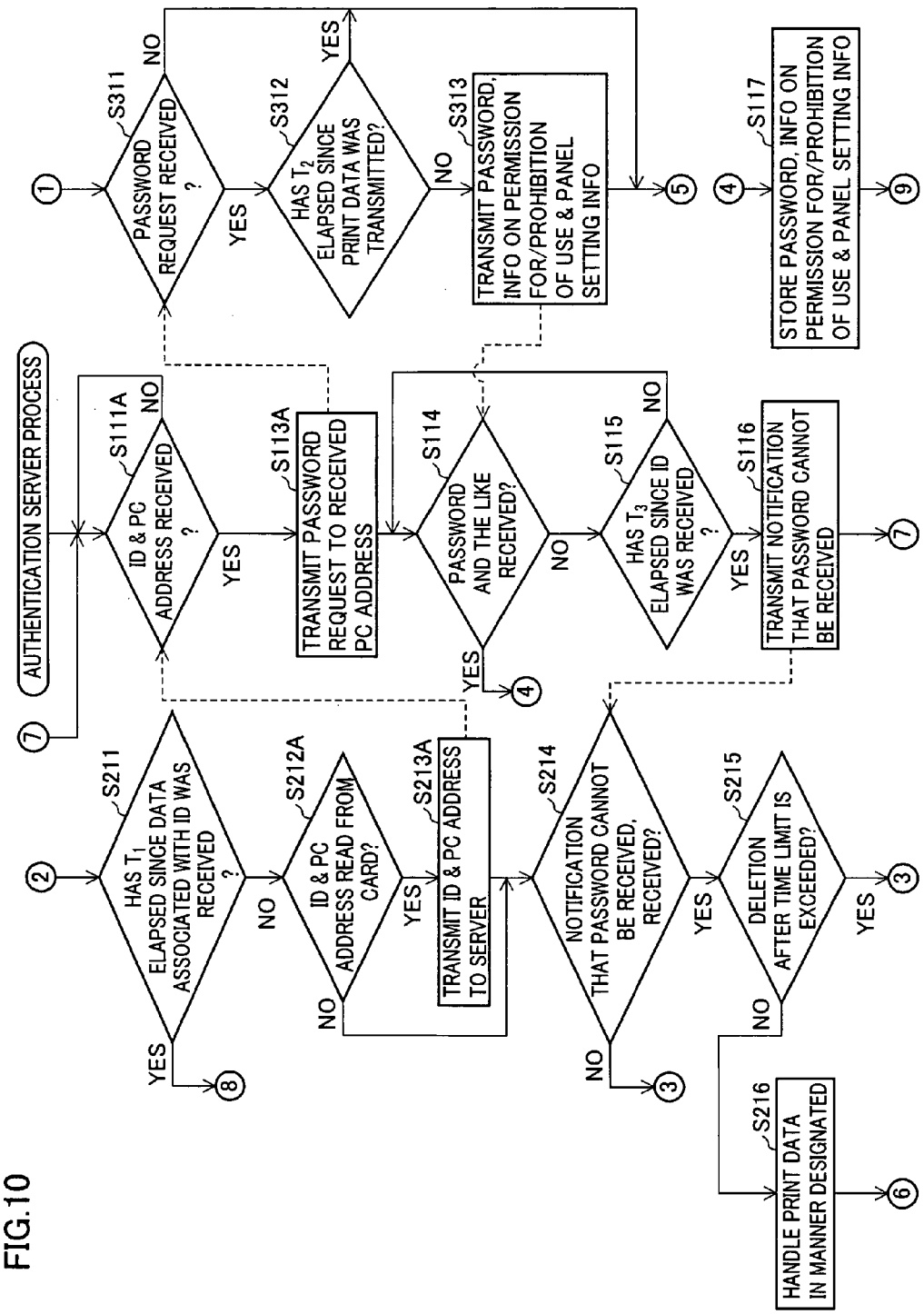
FIG. 10 is a second flowchart of an image output authentication process performed in an image output authentication system of a second embodiment.

FIG. 10 is a second flowchart of an image output authentication process performed in image output authentication system 10 in a second embodiment. Image output authentication system 10 in the second embodiment is similar in configuration to that in the first embodiment described with reference to FIG. 1 and includes authentication server 100, MFP 200 and PC 300 similar in configuration to those described in the first embodiment with reference to FIGS. 3, 2 and 4, respectively. Furthermore, while the image output authentication process also includes a flow other than that indicated in the FIG. 10 second flowchart, the flow is similar to the first and third flowcharts described in the first embodiment with reference to FIGS. 6 and 9, respectively. Accordingly it will not be described repeatedly.

Furthermore the FIG. 10 flowchart corresponds to the FIG. 8 flowchart having steps S212, S213, and S111-S113 replaced with steps S212A, S213A, S111A, and S113A. The remainder in the FIG. 10 flowchart is similar to that in the FIG. 8 flowchart and accordingly will not be described repeatedly.

In the first embodiment, IC card 291 has previously stored therein the information that allows the user ID of a user who possesses the card to be determined. Furthermore an IP address that identifies a PC used by the user associated with that user ID is previously stored in authentication server 100 at storage unit 120.

In the second embodiment, with reference to FIG. 10, an IC card 291A has previously stored therein information that allows the user ID of a user possessing the card and an IP address identifying a PC used by the user associated with that user ID to be determined.

Note that the information stored in IC card 291A that identifies a PC is not limited to an IP address; the information may be a MAC address or other information that can identify the PC.

If control unit 210 determines that time $T_1$ has not yet elapsed since the print data stored in storage unit 220 in association with a user ID was received (NO at S211), then control unit 210 proceeds to step S212A to determine whether the user places IC card 291A over card reader unit 290, whether information allowing a user ID and an IP address of PC 300 used by the user associated with that user ID to be determined is read from IC card 291A, and whether a user ID and an IP address are determined from that information.

If control unit 210 determines that the information that allows a user ID and an IP address to be determined is not read (NO at S212A) then control unit 210 proceeds to step S214.

If control unit 210 determines that the information that allows a user ID and an IP address to be determined is read (YES at S212A) then control unit 210 proceeds to step S213A to control communication unit 260 to transmit on LAN 900 to authentication server 100 the user ID and IP address determined at step S212A. Subsequently control unit 210 proceeds to step S214.

Then in authentication server 100 at step S111A control unit 110 determines whether communication unit 160 has received the user ID and IP address transmitted from MFP 200 on LAN 900.

If not (NO at S111A), then control unit 110 repeats step S111A.

Otherwise (YES at S111A) control unit 110 proceeds to step S113A to control communication unit 160 to transmit a password request, which is information for requesting that a password should be transmitted, on LAN 900 to PC 300 of the IP address received at step S111A.

Thus, in the second embodiment, as has been described at the FIG. 10 step S212A, MFP 200 receives information input that allows a user ID and in addition an IP address that can identify PC 300 used by the user associated with that user ID to be determined, and the IP address is determined. As has been described at the FIG. 10 step S213A, MFP 200 transmits the determined IP address to authentication server 100. As has been described at the FIG. 10 step S111A, authentication server 100 further receives the IP address transmitted by MFP 200. As has been described at the FIG. 10 step S113A, authentication server 100 obtains a password from PC 300 of the received IP address. This ensures that a password can be obtained from PC 300 associated with a user ID.

The aforementioned embodiment in a variation will now be described.

In the aforementioned embodiment an image transmission apparatus is implemented as PC 300 and an image output apparatus outputting an image transmitted from the image transmission apparatus is implemented as MFP 200.

The apparatuses are, however, not limited thereto. The image transmission apparatus may be any other apparatus that can transmit an image to the image output apparatus. It may for example be: a computer, a mobile phone, a PDA, a facsimile or a set top box transmitting to the image output apparatus an image stored in a storage unit or an image externally received; a scanner or a digital camera, either still or video, transmitting to the image output apparatus an image that has been converted into optically digitized data; or a video recorder, a DVD recorder or a hard disk recorder reading and transmitting to the image output apparatus an image stored in a storage medium.

Furthermore, the image output apparatus may be any that can output an image transmitted from an external apparatus.

It may for example be: a printing apparatus printing an image to output the image; a facsimile transmitting an image to another facsimile to output the image; or a computer, a mobile phone or a PDA outputting an image to a storage medium or outputting an image via the Internet to an external computer, mobile phone or PDA or causing a display unit to display the image to output the image.

Furthermore image output authentication system 10 may include an image transmission apparatus and an image output apparatuses in any combination of the apparatuses specifically indicated above. For example, it may be a printing apparatus (an image output apparatus) receiving an image from a computer (an image transmission apparatus) and printing the image to output the image. It may be a facsimile (an image output apparatus) receiving an image from a computer (an image transmission apparatus) and outputting the image on a telephone line or an Internet line to a counterpart facsimile to output the image. It may be a computer (an image output apparatus) receiving an image that is taken in through a scanner (an image transmission apparatus) or received by a facsimile (an image transmission apparatus), and outputting the image to a storage medium or via the Internet to an external computer or causing a display unit to display the image to output the image.

In the above described embodiments authentication server 100 is discrete from MFP 200. Alternatively, the function of authentication server 100 may be included in MFP 200.

In the above described embodiments authentication server 100, MFP 200 and PC 300 are networked by LAN 900. Alternatively they may be networked by a virtual private network, a dedicated line or a network that has security maintained against outside.

In the above described embodiments PC 300 transmits to MFP 200 image data that has been converted into print data. However, print data can also be considered as a concept included in image data. This can be conceived as PC 300 transmitting image data to MFP 200. Furthermore, image data may exactly be transmitted to MFP 200 and MFP 200 may convert the image data into print data.

In the above described embodiments, a password authentication result is transmitted from authentication server 100 to MFP 200, and if in MFP 200 a decision is made that the password authentication result indicates that passwords match, such decision is regarded as a permission provided by authentication server 100 to output an image.

Alternatively, if a decision is made that passwords match, authentication server 100 may transmit information to MFP 200 to permit it to output an image.

In the above described embodiments a user ID and a password of the user ID are previously stored in authentication server 100 at storage unit 120 in association with each other. Alternatively the password may be registered, edited and deleted through PC 300.

In the first embodiment a user ID and an IP address of PC 300 used by the user associated with the user ID are previously stored in authentication server 100 at storage unit 120 in association with each other. The IP address may be registered, edited and deleted through PC 300.

In the above described embodiments the FIG. 8 step S313 is performed to transmit a password, information on permission for/prohibition of use, and panel setting information. Alternatively, a section ID and a section password of a section to which a user belongs may further be transmitted. This can eliminate the trouble of inputting a section ID and a section password at NFP 200 if it is necessary to do so for printing.

In the above described embodiments the present invention has been described as image output authentication system 10 including authentication server 100, MFP 200 and PC 300. Alternatively, the present invention can be perceived as an image output authentication method performed in image output authentication system 10. Furthermore, the present invention can be perceived as the apparatuses, or authentication server 100, MFP 200 and PC 300, included in image output authentication system 10. Furthermore, the present invention can be perceived as an image output authentication method or program causing authentication server 100, MFP 200 or PC 300 included in image output authentication system 10 to perform the process described with reference to FIG. 6, 8, 9 or 10.

Furthermore the present invention can be perceived a computer readable storage medium having the image output authentication program stored therein. This storage medium may be magnetic tape, a flexible disk, a hard disk or an other similar magnetic disk, a CD-ROM, a CD-R, a CD-RW, a DVD-ROM, a DVD-R, a DVD-RW, a DVD-RAM, a DVD+R, a DVD+RW or an other similar optical disk, a magneto-optical (MO) disk, a memory card, a USB memory, or an other similar medium carrying a program therein in a fixed manner; or a medium fluxionally carrying a program, such as downloading the program on a communication network from a server such as an application service provider (ASP).

Although the present invention has been described and illustrated in detail, it is clearly understood that the same is by way of illustration and example only and is not to be taken by way of limitation, the scope of the present invention being interpreted by the terms of the appended claims.

What is claimed is:

1. An image output authentication system comprising an image output apparatus outputting an image, an image transmission apparatus transmitting image data corresponding to said image, and an authentication server authenticating a user,
    said image transmission apparatus including
        a first user identification information determination unit receiving information input that allows user identification information to be determined, to determine said user identification information, said user identification information being provided for identifying a user,
        a first password input unit receiving a password input associated with said user identification information determined by said first user identification information determination unit, and
        an image transmission unit transmitting to said image output apparatus image data and said user identification information determined by said first user identification information determination unit,
    said image output apparatus including
        an image reception unit receiving said image data and said user identification information transmitted by said image transmission unit,
        an image storage unit storing said image data and said user identification information received by said image reception unit therein in association with each other,
        a second user identification information determination unit receiving information input that allows user identification information to be determined, to determine said user identification information, and
        a user identification information transmission unit transmitting to said authentication server said user identification information determined by said second user identification information determination unit, said authentication server including
- a user storage unit having said user identification information and a password of that user identification information, previously stored therein in association with each other,
- a user identification information reception unit receiving said user identification information transmitted by said user identification information transmission unit,
- a password obtaining unit obtaining said password received by said first password input unit, from said image transmission apparatus used by a user associated with said user identification information received by said user identification information reception unit, after said user identification information is received,
- an authentication unit determining whether said password obtained by said password obtaining unit and said password stored in said user storage unit in association with said user identification information received by said user identification information reception unit match, and
- an image output permission unit permitting said image output apparatus that had sent said user identification information received by said user identification information reception unit, to output an image corresponding to said image data stored in said image storage unit of that image output apparatus in association with that user identification information, if said authentication unit determines that said passwords match, said image output apparatus further including
- an image output unit outputting said image if said image output permission unit permits outputting said image, wherein:
said second user identification information determination unit receives information input that allows, in addition to said user identification information, image transmission apparatus identification information to be determined, to determine said image transmission apparatus identification information, said image transmission apparatus identification information allowing said image transmission apparatus used by the user associated with that user identification information to be identified;
said user identification information transmission unit further transmits to said authentication server said image transmission apparatus identification information determined by said second user identification information determination unit;
said user identification information reception unit further receives said image transmission apparatus identification information transmitted by said user identification information transmission unit; and
said password obtaining unit obtains said password from said image transmission apparatus associated with said image transmission apparatus identification information received by said user identification information reception unit.

2. The image output authentication system according to claim 1, wherein:
said image output apparatus further includes a second password input unit receiving a password input, if said image output permission unit does not permit outputting said image, said password being associated with said user identification information determined by said second user identification information determination unit;
said password obtaining unit further obtains said password received by said second password input unit, from said image output apparatus that is not permitted by said image output permission unit to output said image.

3. The image output authentication system according to claim 1, wherein after said image reception unit receives said image data, once a predetermined image output time limit has been exceeded, said image output unit does not output said image.

4. The image output authentication system according to claim 1, wherein:
said password obtaining unit includes a password request unit requesting said image transmission apparatus associated with said user identification information received by said user identification information reception unit, to transmit a password;
said image transmission apparatus further includes a password transmission unit transmitting in response to the request received from said password request unit said password received by said first password input unit; and
said password obtaining unit further includes a password reception unit receiving said password transmitted by said password transmission unit.

5. The image output authentication system according to claim 4, wherein after said image transmission unit transmits said image data, once a predetermined password transmission time limit has been exceeded, said password transmission unit does not transmit said password.

6. The image output authentication system according to claim 1, wherein:
said image transmission apparatus further includes an image-handling-information transmission unit transmitting information to said image output apparatus when said image transmission unit transmits said image data, said information indicating a manner of handling said image data to prevent said image data from leaking when said password obtaining unit cannot obtain said password; and
said image output apparatus further includes an image handling unit handling said image data stored in said image storage unit, in a manner indicated by said information transmitted by said image-handling-information transmission unit, if said password obtaining unit cannot obtain said password.

7. The image output authentication system according to claim 1, wherein:
said image output permission unit includes an authentication result transmission unit transmitting an authentication result indicating whether said authentication unit determines that said passwords match;
said image output apparatus further includes
- an authentication result reception unit receiving said authentication result transmitted by said authentication result transmission unit, and
- an authentication result determination unit determining whether said authentication result received by said authentication result reception unit indicates a decision that said passwords match; and
if said authentication result determination unit determines that said authentication result indicates a decision that said passwords match, such determination is regarded as a permission to output said image, and said image output unit outputs said image.

8. The image output authentication system according to claim 1, wherein said authentication server further includes:
a setting-information obtaining unit obtaining setting information from said image transmission apparatus when said password obtaining unit obtains said password from said image transmission apparatus, said setting information being provided for setting said image output apparatus; and a setting-process performing unit performing a setting process for setting said image output apparatus in accordance with said setting information obtained by said setting-information obtaining unit, if said image output permission unit permits said image output apparatus to output said image.

9. The image output authentication system according to claim 8, wherein:
said setting information is provided for setting an indication of said image output apparatus displayed for operation, depending on a user; and
said setting-process performing unit performs said setting process for setting said indication of said image output apparatus displayed for operation, depending on the user, in accordance with said setting information.

10. The image output authentication system according to claim 8, wherein:
said setting information indicates a place for which the user is permitted to use said image output apparatus in said place when the user resides at said place;
said setting-process performing unit performs a setting process setting what said setting information indicates; and
said authentication server further includes
a location obtaining unit obtaining a location of the user,
a location determination unit determining whether said location of the user that is obtained by said location obtaining unit is included in said place indicated in said setting information, and
an image output permission canceling unit canceling the permission provided by said image output permission unit to output said image, if said location determination unit determines that said location is not included in said place indicated in said setting information.

11. The image output authentication system according to claim 1, wherein said second user identification information determination unit receives said information that allows said user identification information to be determined, that is input from a storage medium having stored therein said information that allows said user identification information to be determined.

12. The image output authentication system according to claim 1, wherein:
said image transmission apparatus is a personal computer;
said image output apparatus is an image formation apparatus;
said image transmission unit further includes an image storage unit storing said image data therein;
said image transmission unit transmits said image data stored in said image storage unit; and
said image output unit prints said image on a printing sheet to output said image.

13. The image output authentication system according to claim 12, wherein said image output apparatus is a multifunction peripheral including said image formation apparatus.

\* \* \* \* \*